Patented June 26, 1945

2,379,081

UNITED STATES PATENT OFFICE 2,379,081

CATALYTIC DEHYDROGENATION

Walter F. Huppke, Lomita, and Theodore Vermeulen, Los Angeles, Calif., assignors to Union Oil Company of California, Los Angeles, Calif., a corporation of California No Drawing. Application January 15, 1940, Serial No. 313,935

15 Claims. (Cl. 260—683.3)

This invention relates to catalysts and catalytic processes for the dehydrogenation of various hydrocarbons. More particularly, the invention relates to the production of unsaturates from the light or normally gaseous hydrocarbons such as propane, butane, isobutane and the like.

The principal objects of the invention are to provide an efficient catalyst which is comparatively easy to produce, is long lived, is not easily poisoned and at the same time causes an adequately high conversion rate of the saturates to unsaturates.

Briefly, the invention comprises a catalyst in the form of a molten boric oxide ($B_2O_3$) which is activated by the presence of a small proportion, for example about 2%, of an activating oxide which is soluble in the molten boric oxide. Such an activating oxide is zinc oxide, but other oxides such as uranium oxide, which are soluble in the molten boric oxide may be used. The invention also resides in the method of producing unsaturates from the saturated light hydrocarbons, particularly the normally gaseous petroleum hydrocarbons such as propane and butane, by passing the hydrocarbon gases or vapors through a molten body of the catalyst. The invention also resides in the dehydrogenation or similar conversion of hydrocarbons by contact with boric oxide activated with a small percentage of an activating oxide such as zinc oxide, without respect as to whether the catalyst is molten or solid.

According to one form of practicing the present invention a molten boric oxide bath is prepared in an iron vessel or other appropriate vessel, and into this bath there is introduced an activating proportion of an activating oxide which preferably is soluble in the molten boric oxide. In general about 2% of such an activating oxide is employed, but this may be varied within appropriate ranges such as between about 1% and about 5%. Other activating oxides which can be employed, and most of which are adequately soluble in molten boric oxide are the oxides or iron, copper, vanadium and uranium. Apparently any oxide soluble in the molten boric oxide is effective, and some oxides such as uranium oxide which are not soluble in the molten boric oxide nevertheless possess activating properties when well dispersed through the melt. The molten boric oxide melts at about 1065° F. and is quite viscous up to a temperature of about 1100° F. Preferred operating ranges are from a little under 1200° F. to about 1250° F. Even at these ranges the viscosity of the melt is sufficient to maintain suspension of an insoluble activator during the operating conditions. The various usable oxides are stable oxides, that is, in order to be present as oxides in the catalytic mass during treatment their form will not change under the operating conditions.

The molten boric oxide containing the activating oxide as above indicated is placed in a vertical elongated iron reactor vessel or the like through which the gaseous or vaporous hydrocarbon to be treated may be bubbled. For example, a vertical cylinder about six inches in diameter and three or four feet high whose walls are provided with suitable heating means such as electric heating elements and which contains in its lower end means for distributing and bubbling the gases or vapors uniformly through the melt, constitutes satisfactory equipment. The heating means must be adapted to raise the temperature to the required range of about 1200° F. to about 1250° F. The line through which the gaseous or vaporous hydrocarbons are introduced should contain a preheater to raise the materials to be treated to a temperature approximating that of the reactor vessel.

The treatment consists simply in introducing preheated vaporous or gaseous hydrocarbons into the bottom of the reactor vessel through the distributor means mentioned so that such materials will bubble upward through the molten boric oxide mass. The rate of feed at the height of the molten mass should be such that the contact time of the vaporous material with the molten mass approximates one second, a contact range between about 0.1 second and 5.0 seconds appearing to be permissible.

Where operating with a ten inch column of molten boric oxide containing 2% of zinc oxide dissolved therein, and bubbling propane gas up through the column mass at 1200° F. approximately 20% of the feed was converted into unsaturates, a typical analysis of the product being as follows:

|  | Per cent |
|---|---|
| Hydrogen | 9.7 |
| Methane | 7.3 |
| Ethylene | 12.1 |
| Propylene | 11.1 |
| Ethane | 3.7 |
| Propane | 56.1 |
|  | 100.0 |

Where operating at the lower temperatures of 1150° F. the conversion rate was about 5%; at 1200° F. the conversion rate was about 10% and at 1250° F. the conversion to unsaturates was about 24%, but the formation of tar and excessive amounts of methane commenced. In other instances a conversion rate of about 24% at 1250° F. was obtained without appreciable carbon or tar formation. In other instances where about ½% of uranium oxide was added to the boric oxide melt containing zinc oxide a conversion rate of about 23% was obtained at 1200° F. At temperatures around 1300° F. cracking with the formation of tars, carbon and methane predominates.

While we have found molten boric oxide containing a small percentage of activating oxide as has been described, to be most effective for the conversion of hydrocarbons, we have also found that a similar material may be prepared in solid form by depositing the boric oxide and activating oxide on a carrier such as alundum granules. This can be done, for example, by dissolving 20 parts of boric oxide and 4 parts of zinc nitrate in a minimum of boiling water and adding this to 100 parts of alundum granules, and then heating slowly until all the water is driven off and the nitrate is decomposed to leave the oxide. This material has been used in beds in silica tubes, and isobutane passed thereover at a contact rate of about 0.8 seconds per pass at temperatures of about 1150° F. to 1200° F. with a conversion rate into unsaturates of about 22%. With propane the conversion rate is somewhat lower.

The value of the boric oxide and the activating zinc oxide is shown by comparing a test of the alundum granules alone under the same conditions where a conversion of only 5% was obtained which may be classed as wholly pyrolytic conversion. Here, again the activating oxide may be any of the type above described. In employing catalysts on a carrier of this type the feed material should be preheated as where using the molten form, and temperature ranges for the various types of materials treated will be employed approximately as when using the molten form of catalyst.

In employing this solid form of catalyst, other refractory carriers than alundum may be employed such as silica gels, and gels precipitated with ammonium hydroxide or the like such as zirconium, thorium, and aluminum gels which are in fact hydrous gels which have not been treated to the point of complete dehydration and still possess their characteristic porous gel structure and adsorptive properties.

It is to be understood that these disclosures are illustrative of the generic invention and are not to be taken as limiting except as restricted by the appended claims.

We claim:

1. A method for the conversion of hydrocarbons to change their carbon-to-hydrogen ratio comprising subjecting saturated hydrocarbons in gaseous state at temperatures between about 1100° F. and 1300° F. to the influence of molten boric oxide containing a small proportion of an activating metallic oxide.

2. A method for the conversion of saturated hydrocarbons comprising subjecting the saturated hydrocarbons to the action of molten boric oxide containing an activating proportion of zinc oxide at conversion temperatures.

3. A method for dehydrogenating hydrocarbons comprising passing gaseous or vaporous hydrocarbons through molten boric oxide at a temperature between about 1100° F. and about 1300° F. and containing between about 1% and about .5% of zinc oxide.

4. A method for the conversion of hydrocarbons to change their carbon-to-hydrogen ratio comprising passing saturated normally gaseous hydrocarbons in a gaseous state through molten boric oxide containing an activating proportion of a stable metal oxide at temperatures between 1100° F. and 1300° F.

5. A method for the dehydrogenation of saturated hydrocarbons comprising passing a preheated hydrocarbon in gaseous or vaporous state through a molten mass of boric oxide containing an activating proportion of an activating stable metallic oxide at elevated temperatures in the order of 1100° F. to 1300° F. to effect unsaturation of saturated materials.

6. A method according to claim 1 wherein the saturated hydrocarbon is a light hydrocarbon.

7. A method according to claim 2 wherein the saturated hydrocarbon is a normally gaseous hydrocarbon.

8. A method according to claim 3 wherein the hydrocarbon treated is a normally gaseous hydrocarbon.

9. A method according to claim 5 wherein the hydrocarbon treated is a normally gaseous hydrocarbon.

10. A method according to claim 5 wherein the preheated gases or vapors are bubbled up through the molten mass at a rate to yield a contact period of about 0.1 second to five seconds.

11. A method according to claim 5 wherein the activating oxide is soluble in the molten boric oxide.

12. A method for cracking hydrocarbons comprising passing gaseous or vaporous hydrocarbons at conversion temperature through a molten mass of boric oxide containing a small proportion of a stable activating metallic oxide.

13. A method according to claim 1 wherein the activating oxide is selected from the class consisting of zinc oxide, iron oxide, copper oxide, vanadium oxide and uranium oxide.

14. A method according to claim 4 wherein the activating metal oxide is zinc oxide.

15. A method according to claim 5 wherein the hydrocarbon treated is propane and the activating oxide is from the class consisting of zinc, iron, copper, vanadium and uranium oxides.

WALTER F. HUPPKE.
THEODORE VERMEULEN.